United States Patent
Narasimha (10) Patent No.: US 10,203,718 B1
(45) Date of Patent: Feb. 12, 2019

(54) GENERATING DELAYS OF EXIT POINTS FOR A CLOCK CIRCUIT

(71) Applicant: Xilinx, Inc., San Jose, CA (US)

(72) Inventor: Usha Narasimha, Plano, TX (US)

(73) Assignee: XILINX, INC., San Jose, CA (US)

(*) Notice: Subject to any disclaimer, the term of this patent is extended or adjusted under 35 U.S.C. 154(b) by 139 days.

(21) Appl. No.: 15/192,299

(22) Filed: Jun. 24, 2016

(51) Int. Cl.
*G06F 1/12* (2006.01)
*G06F 1/10* (2006.01)

(52) U.S. Cl.
CPC . *G06F 1/12* (2013.01); *G06F 1/10* (2013.01)

(58) Field of Classification Search
CPC ............................................................. G06F 1/12
USPC ................................. 713/300, 400, 500, 600
See application file for complete search history.

(56) References Cited

U.S. PATENT DOCUMENTS

| | | | | |
|---|---|---|---|---|
| 8,584,075 | B2* | 11/2013 | Datta | G06F 17/5081 716/101 |
| 9,065,446 | B1* | 6/2015 | Savithri | H03K 19/17792 |
| 2014/0207795 | A1* | 7/2014 | Zhou | G06F 17/30424 707/748 |
| 2015/0163224 | A1* | 6/2015 | Kim | H04L 63/1441 726/27 |
| 2016/0180556 | A1* | 6/2016 | Deng | G06T 11/206 345/440 |

* cited by examiner

*Primary Examiner* — Jaweed A Abbaszadeh
*Assistant Examiner* — Sumil M Desai
(74) *Attorney, Agent, or Firm* — Kevin T. Cuenot (57) ABSTRACT

Generating delays for a clock circuit includes, determining, using a processor, groups of contexts for exit points of the clock circuit based upon a plurality of characteristics and a type selected from a plurality of different types for each characteristic, forming, using the processor, sub-groups of the exit points based upon delay values for the exit points, and determining, using the processor, a mean delay value for each sub-group.

14 Claims, 6 Drawing Sheets

| End Point | Buffer | Buffer Node | Pre-Buffer | Pre-Buffer Node | Buffer Tile X-ings | Pre-Buffer X-ings | Buffer Delay | Node Delay |
|---|---|---|---|---|---|---|---|---|
| 1 | ClkBuf1 | VDISTR | ClkBuf2 | VROUTE | *Tile(s) ID* | *Tile(s) ID* | *Delay* | *Delay* |
| 2 | ClkBuf1 | VDISTR | ClkBuf2 | VROUTE | *Tile(s) ID* | *Tile(s) ID* | *Delay* | *Delay* |
| 3 | ClkBuf2 | HDISTR | ClkBuf2 | HROUTE | *Tile(s) ID* | *Tile(s) ID* | *Delay* | *Delay* |
| 4 | ClkBuf1 | VDISTR | ClkBuf4 | VROUTE | *Tile(s) ID* | *Tile(s) ID* | *Delay* | *Delay* |
| 5 | ClkBuf3 | VDISTR | ClkBuf2 | VROUTE | *Tile(s) ID* | *Tile(s) ID* | *Delay* | *Delay* |
| 6 | ClkBuf2 | HDISTR | ClkBuf2 | HROUTE | *Tile(s) ID* | *Tile(s) ID* | *Delay* | *Delay* |
| 7 | ClkBuf1 | VDISTR | ClkBuf3 | VROUTE | *Tile(s) ID* | *Tile(s) ID* | *Delay* | *Delay* |
| 8 | ClkBuf1 | VDISTR | ClkBuf3 | VROUTE | *Tile(s) ID* | *Tile(s) ID* | *Delay* | *Delay* |
| 9 | ClkBuf1 | VDISTR | ClkBuf3 | VROUTE | *Tile(s) ID* | *Tile(s) ID* | *Delay* | *Delay* |
| 10 | ClkBuf1 | VDISTR | ClkBuf2 | VROUTE | *Tile(s) ID* | *Tile(s) ID* | *Delay* | *Delay* |
| ⋮ | ⋮ | ⋮ | ⋮ | ⋮ | ⋮ | ⋮ | ⋮ | ⋮ |

| Group | End Point | Buffer | Buffer Node | Pre-Buffer | Pre-Buffer Node | Buffer Tile X-ings | Pre-Buffer X-ings | Buffer Delay | Node Delay |
|---|---|---|---|---|---|---|---|---|---|
| 1 | 1 | ClkBuf1 | VDISTR | ClkBuf2 | VROUTE | *Tile(s) ID* | *Tile(s) ID* | *Delay* | *Delay* |
| 1 | 2 | ClkBuf1 | VDISTR | ClkBuf2 | VROUTE | *Tile(s) ID* | *Tile(s) ID* | *Delay* | *Delay* |
| 1 | 10 | ClkBuf1 | VDISTR | ClkBuf2 | VROUTE | *Tile(s) ID* | *Tile(s) ID* | *Delay* | *Delay* |
| 2 | 3 | ClkBuf2 | HDISTR | ClkBuf2 | HROUTE | *Tile(s) ID* | *Tile(s) ID* | *Delay* | *Delay* |
| 2 | 6 | ClkBuf2 | HDISTR | ClkBuf2 | HROUTE | *Tile(s) ID* | *Tile(s) ID* | *Delay* | *Delay* |
| 3 | 4 | ClkBuf1 | VDISTR | ClkBuf4 | VROUTE | *Tile(s) ID* | *Tile(s) ID* | *Delay* | *Delay* |
| 4 | 5 | ClkBuf3 | VDISTR | ClkBuf2 | VROUTE | *Tile(s) ID* | *Tile(s) ID* | *Delay* | *Delay* |
| 5 | 7 | ClkBuf1 | VDISTR | ClkBuf3 | VROUTE | *Tile(s) ID* | *Tile(s) ID* | *Delay* | *Delay* |
| 5 | 8 | ClkBuf1 | VDISTR | ClkBuf3 | VROUTE | *Tile(s) ID* | *Tile(s) ID* | *Delay* | *Delay* |
| 5 | 9 | ClkBuf1 | VDISTR | ClkBuf3 | VROUTE | *Tile(s) ID* | *Tile(s) ID* | *Delay* | *Delay* |
| ⋮ | ⋮ | ⋮ | ⋮ | ⋮ | ⋮ | ⋮ | ⋮ | ⋮ | ⋮ |

GENERATING DELAYS OF EXIT POINTS FOR A CLOCK CIRCUIT

FIELD OF THE INVENTION

This disclosure relates to generating delays of exit points for a clock circuit.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Determining delays for a programmable IC can be challenging. Modern circuit designs for programmable ICs include a large number of circuit nodes with the circuitry having many different operating contexts. Achieving greater accuracy through evaluation of all possible combinations of operating contexts for the different circuit nodes may not be computationally feasible. Still, accurate delay information is necessary to perform tasks such as circuit design, simulation, determining maximum operating frequency, and so forth.

SUMMARY

A method of generating delays for a clock circuit includes determining, using a processor, groups of contexts for exit points of the clock circuit based upon a plurality of characteristics and a type selected from a plurality of different types for each characteristic, forming, using the processor, sub-groups of the exit points based upon delay values for the exit points, and determining, using the processor, a delay value for each sub-group.

A system includes a processor configured to initiate executable operations for generating delays for a clock circuit. The executable operations include determining groups of contexts for exit points of the clock circuit based upon a plurality of characteristics and a type selected from a plurality of different types for each characteristic, forming sub-groups of the exit points based upon delay values for the exit points, and determining a delay value for each sub-group.

A computer program product includes a computer readable storage medium having program code stored thereon for generating delays for a clock circuit. The program code is executable by a processor to perform operations. The operations include determining, using the processor, groups of contexts for exit points of the clock circuit based upon a plurality of characteristics and a type selected from a plurality of different types for each characteristic, forming, using the processor, sub-groups of the exit points based upon delay values for the exit points, and determining, using the processor, a delay value for each sub-group.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 7 is a table illustrating an example of combined data.

FIG. 8 is a table illustrating an example of group formation.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to circuit design and, more particularly, to clock circuits. In accordance with the inventive arrangements described herein, delays for exit points of a clock circuit may be determined. The clock circuit may be implemented within an integrated circuit (IC). In one aspect, the IC may be a programmable IC such as a field programmable gate array (FPGA). It should be appreciated that while the inventive arrangements described herein refer to a programmable IC from time to time, the inventive arrangements described herein may be used and/or applied to other types of ICs and are not intended to be limited to one particular type of IC. The examples described herein may be applied to nearly any type of IC. Further, the examples described within this disclosure may be applied to nearly any circuit having a structure similar to the circuit structures described herein.

One or more examples for generating delay values for exit points of a clock circuit are described. The examples generally include assembling data that describe exit points of a clock circuit. The exit points may be assigned to a plurality of different groups according to a context of each exit point. Each context includes one or more characteristics of the clock circuit, e.g., a portion of the clock circuit including the end point. Each characteristic has a type assigned thereto from a plurality of different possible types for each respective characteristic.

The end points are also associated with delay values. In one aspect, the delay values are determined from a SPICE simulation. The groups of exit points may be further processed to generate sub-groups of exit points for the respective groups. The sub-groups may be generated according to the delay values. In one example, for each sub-group, a sub-group specific delay value may be determined from the delay values associated with the exit points of the sub-group. The sub-group specific delay values may be output. Depending on the clock circuit, tens or even hundreds of thousands of different exit points and corresponding delay values are reduced to a desirable number of sub-groups of exit points and corresponding delay values.

In performing operations such as circuit design, simulation, correlating clock frequencies to circuits, and so forth, it may not be feasible for an electronic design automation (EDA) system to handle exit points on an individual basis. In some cases, for example, handling exit points individually is not possible given the large number of exit points and constraints on computer resources such as processor limitations, memory limitations, bandwidth limitations on reading and/or writing data, etc. In other cases, handling exit points individually leads to unacceptably high runtimes. Thus, the inventive arrangements described herein provide increased performance for an EDA system in terms of reduced runtime while operating on a circuit design. The inventive arrangements described herein also enable an EDA system to perform operations on a circuit design that is larger than would otherwise be the case. By handling end points and delay values on a sub-group basis, the number of exit points and delay values (e.g., variables and memory required), is significantly reduced within the EDA system.

In one aspect, the inventive arrangements described herein may be implemented as a method or process performed by a data processing system such as a computer system. In another aspect, the inventive arrangements may be implemented as a data processing system having a processor configured to initiate the various operations described herein. In still another aspect, the inventive arrangements may be implemented as a non-transitory computer-readable storage medium storing program code that, when executed, causes a processor and/or a system to perform and/or initiate a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
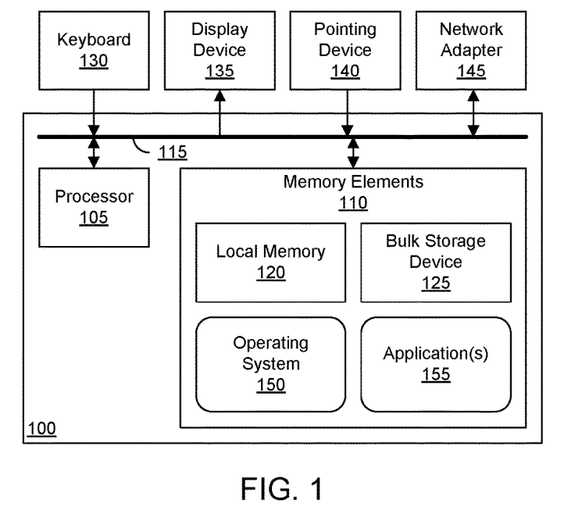
FIG. 1 is a block diagram illustrating an exemplary data processing system.

FIG. 1 is a block diagram illustrating an exemplary data processing system (system) 100. System 100 is an example of an EDA system. System 100 may be configured to perform the operations described herein relating to circuit analysis and determining delays for exit points of clock circuits.

As pictured, system 100 includes at least one processor, e.g., a central processing unit (CPU), 105 coupled to memory elements 110 through a system bus 115 or other suitable circuitry. System 100 stores computer readable instructions (also referred to as "program code") within memory elements 110. Memory elements 110 may be considered an example of computer readable storage media. Processor 105 executes the program code accessed from memory elements 110 via system bus 115.

Memory elements 110 may include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), a solid state drive (SSD), or other persistent data storage device. System 100 may also include one or more cache memories (not shown) that provide temporary storage of at least some program code in order to reduce the number of times program code must be retrieved from bulk storage device 125 during execution.

Input/output (I/O) devices such as a keyboard 130, a display device 135, a pointing device 140, and one or more network adapters 145 may be coupled to system 100. The I/O devices may be coupled to system 100 either directly or through intervening I/O controllers. In some cases, one or more of the I/O devices may be combined as in the case where a touchscreen is used as display device 135. In that case, display device 135 may also implement keyboard 130 and pointing device 140. Network adapter 145 may be used to couple system 100 to other systems, computer systems, remote printers, and/or remote storage devices through intervening private or public networks. Modems, cable modems, Ethernet cards, and wireless transceivers and/or radios are examples of different types of network adapter 145 that may be used with system 100. Depending upon the particular implementation of system 100, the specific type of network adapter, or network adapters as the case may be, will vary.

As pictured in FIG. 1, memory elements 110 may store an operating system 150 and one or more applications 155. Application 155, for example, is an EDA application. In one aspect, operating system 150 and application 155, being implemented in the form of executable program code, are executed by system 100 and, in particular, by processor 105. As such, operating system 150 and application 155 may be considered an integrated part of system 100. Operating system 150, application 155, and any data items used, generated, and/or operated upon by system 100 are functional data structures that impart functionality when utilized by system 100.

Figure 2:
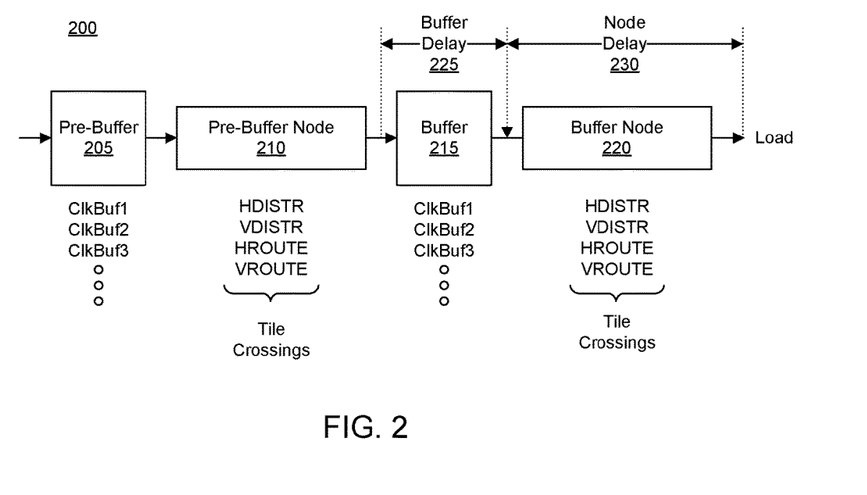
FIG. 2 is a block diagram illustrating an example of an architecture for a clock circuit.

FIG. 2 is a block diagram illustrating an example of an architecture for a clock circuit 200. FIG. 2 illustrates the characteristics and alternative types of the characteristics of clock circuit 200 that may affect the delay of an end point of a clock circuit. System 100, for example, analyzes a circuit, whether a clock circuit or another circuit, using the architecture pictured in FIG. 2.

In FIG. 2, an end point for which analysis is performed is represented as the "load." As pictured, clock circuit 200 includes a pre-buffer 205, a pre-buffer node 210, a buffer 215, and a buffer node 220. As defined within this disclosure, a "context" of an end point for a clock circuit includes a type for each of the characteristics of pre-buffer 205, pre-buffer node 210, buffer 215, and buffer node 220.

Pre-buffer 205 and buffer 215 are clock buffers. The types of characteristics of pre-buffer 205 and buffer 215 include different types of clock buffers. Examples of different types of clock buffers include, but are not limited to, "ClkBuf1," "ClkBuf2," "ClkBuf3," and so forth. Each clock buffer has different electrical properties such as delay, drive strength, and so forth. Same clock buffers have same, or substantially similar, values for the electrical properties. For example, each of the different types of clock buffers may have a different circuit structure and/or a different physical structure (implementation) of the clock buffer within the IC.

Pre-buffer node 210 and buffer node 220 are the circuit nodes driven by pre-buffer 205 and buffer 215, respectively. The types of characteristics of pre-buffer node 210 include different types of circuit nodes driven by pre-buffer 205. For example, pre-buffer node 205 may represent a signal line or wire coupled, e.g., directly coupled, to an output of pre-buffer 205. The types of characteristics of buffer node 220 include different types of circuit nodes driven by buffer 215. For example, buffer node 220 may represent a signal line or wire coupled, e.g., directly coupled, to an output of buffer 215.

Examples of different types of characteristics for pre-buffer node 210 and/or buffer node 220 include HDISTR, VDISTR, HROUTE, and VROUTE. The HDISTR, VDISTR, HROUTE, and VROUTE types of characteristics are different types of clock lines or wires of a clock circuit. The types further may refer to different wires as used within a clock circuit having a tree structure. The HDISTR type of characteristic represents a horizontal distribution line of the main clock circuit. The VDISTR type of characteristic represents a vertical distribution line of the main clock circuit. The HROUTE type of characteristic represents a horizontal line for a lower level of the clock circuit. The VROUTE type of characteristic represents a vertical line for a lower level of the clock circuit. The HDISTR, VDISTR, HROUTE, VROUTE types of lines may have different lengths, different orientations, and so forth.

In one arrangement, the types of characteristics for pre-buffer node 210 and/or buffer node 220 may represent the wire type of a wire, e.g., one wire, used to establish a connection or form the path represented by pre-buffer node 210 and/or buffer node 220. In another arrangement, the types of characteristics may represent one of a plurality of wires used to make a connection. For example, the wire type may be a wire directly coupled to an output of pre-buffer 205 and/or buffer 215.

In another arrangement, a buffer node and a pre-buffer node each may have only one type. In one aspect, the type for the buffer node may be the same as the type for the pre-buffer node. In another aspect, the type for the pre-buffer node may be different than the type of the pre-buffer node.

Tile crossings of pre-buffer node 210 are additional characteristics that may optionally be included in the context for an end point. Tile crossings of buffer node 220 are further characteristics that may optionally be included in the context of an end point. The type of tile crossing indicates a set of one or more tiles of an IC that pre-buffer node 210 and/or buffer node 220 cross or traverse. For example, tiles in an FPGA may include CLB tiles, IOB tiles, BRAM tiles, DSP tiles etc. The type of the tile crossing indicates one or more of the tiles. For example, the type of a tile crossing may be CLB/BRAM/IOB.

Clock circuit 200 also illustrates a buffer delay 225 and a node delay 230. Buffer delay 225 is the amount of time for a signal to pass from an input of buffer 215 to an output of buffer 215. Node delay 230 is the amount of time for a signal to pass from an output of buffer 215 to the load (or end point). Delay values such as buffer delay 225 and/or node delay 230 may be determined from a SPICE or other electronic circuit design and/or simulation. As described herein in greater detail, delays may be omitted from contexts of end points. The delays may be used post grouping for purposes of sub-grouping of the end points.

Figure 3:
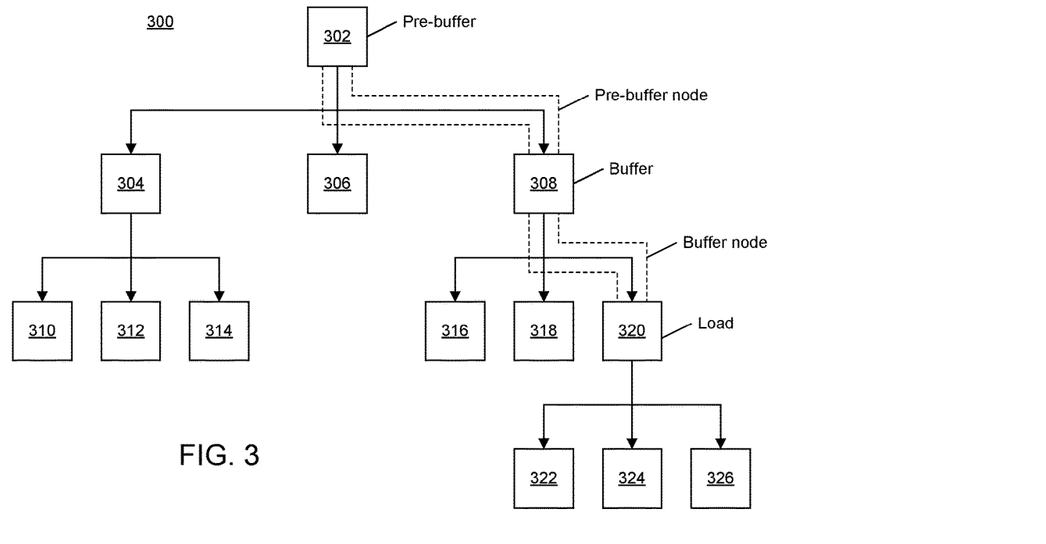
FIG. 3 is a block diagram illustrating an example of a clock circuit.

FIG. 3 is a block diagram illustrating an example of a clock circuit 300. Clock circuit 300 includes one or more buffers arranged in a tree structure and configured to drive and/or distribute a clock signal. Clock circuit 300 is not symmetric. It should be appreciated that a clock circuit may or may not be symmetric. Further, a clock circuit may be significantly larger than the example shown in FIG. 3.

As pictured, clock circuit 300 includes a buffer 302, which may be a root buffer. Clock circuit 300 includes buffers 304, 306, and 308, which may be considered child buffers of buffer 302. Clock circuit 300 also includes buffers 310, 312, and 314, which may be considered child buffers of buffer 304. Clock circuit 300 further includes buffers 316, 318, and 320, which may be considered child buffers of buffer 308. Finally, in the example of FIG. 3, clock circuit 300 includes buffers 322, 324, and 326, which may be considered child buffers of buffer 320.

For purposes of illustration, buffer 320 may be considered a load or end point and analyzed by system 100 using the characteristics and type of characteristics described with reference to FIG. 2. The analysis described may be applied to each of the different buffers to assign the buffers into groups. As shown, buffer 320 is considered the load. The wire, or at least a portion thereof, coupling buffer 308 to buffer 320 is considered the buffer node (e.g., buffer node 220). Buffer 308 is considered the buffer (e.g., buffer 215). The wire, or at least a portion thereof, coupling buffer 302 to buffer 308 is considered the pre-buffer node (e.g., pre-buffer node 210). Buffer 302 is considered the pre-buffer (e.g., pre-buffer 205).

Thus, the end point, i.e., buffer 320, has a context that includes the various types for the characteristics described with reference to FIG. 2 using the above mapping of the nodes of FIG. 3 to the nodes of FIG. 2. Further, buffer 320 may have a buffer delay 225 that is the delay of buffer 308 and a node delay 230 that is the amount of time for the clock signal to traverse from the output of buffer 308 to buffer 320 (e.g., the load).

In characterizing a circuit design or an IC, it becomes necessary to determine delays for the clock circuit. Example delays that may be determined include the delay from an output of a clock buffer to one or more other clock buffers referred to as exit points. Due to the significant number of exit points, however, it is not feasible to determine and use a different, or potentially different, delay (and thus variable) for each exit point of the clock circuit of an IC and handle the exit points individually for purposes of circuit design, simulation, and so forth. Using the mapping and procedure described above for buffer 320, a context for each of the buffers of clock circuit 300 may be determined. The buffers, or end points, may be assigned to groups using the contexts as will be described herein in greater detail. Further, sub-groups for the groups may be determined so that end points may be handled by a system on a sub-group basis.

Figure 4:
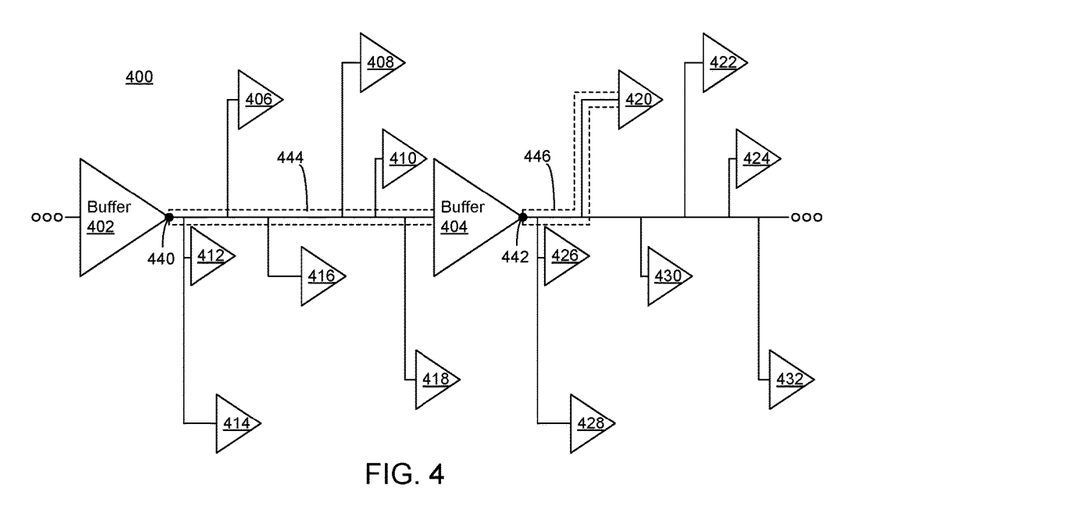
FIG. 4 shows an example of a portion of a clock circuit.

FIG. 4 shows another example of a portion of a clock circuit 400. Clock circuit 400 includes buffers 402 and 404. Clock circuit 400 further includes buffers 406, 408, 410, 412, 414, 416, 418, 420, 422, 424, 426, 428, 430, and 432. Buffers 406-432 are also referred to as endpoints. The portion of clock circuit 400 shown in FIG. 4 may be a portion or branch of a clock circuit with a tree structure as previously described.

In one arrangement, buffers 402 and 404 may be primary clock buffers. A primary clock buffer drives a clock network that spans a long distance on the IC. Primary clock buffers may be configured so that one primary clock buffer drives a clock network that is coupled to an input of a next primary clock buffer that drives a next clock network, and so forth, forming multiple stages of the clock circuit. A primary clock buffer, for example, may drive a clock network that spans thousands of microns on the IC.

In another aspect, buffers 406-432 may be secondary clock buffers. A secondary clock buffer is a buffer of the clock circuit that is also driven by a primary clock buffer as part of the clock network. While an input of the secondary clock buffer is driven by a primary clock buffer, an output of a secondary clock buffer is not coupled to a primary clock buffer. For example, an output of a secondary clock buffer may drive a wire or other resource that is coupled to a circuit element clocked by the wire or other resource.

In one embodiment, for purposes of grouping buffers 406-432, clock circuit 400 may be analyzed using the structure described with reference to FIG. 2. More particularly, one or more nodes of clock circuit 400 may be mapped to clock circuit 200 for purposes of grouping end points (i.e., buffers 406-432) of clock circuit 400. Clock delays of interest for clock circuit 400 are from the output of buffer 402, labeled node 440, to each of buffers 406-418. In order to analyze the delay to buffers 406-418, a prior stage (not shown) of clock circuit 400 would need to be analyzed. Additional clock delays of interest for clock circuit 400 are from the output of buffer 404, labeled node 442, to each of buffers 420-432.

For purposes of illustration, consider an example where buffers 420-432 are analyzed using the structure described with reference to FIG. 2. In that case, buffer 402 may be mapped to pre-buffer 205. Buffer 404 may be mapped to buffer 215. As such, buffer delay 225 represents the delay of buffer 404. Wire 444, e.g., a clock net, may be mapped to pre-buffer node 210. Wire 446, e.g., another clock net, may be mapped to buffer node 220. Each of buffers 420-432 may be considered a load. Node delay 230 represents the delay to a particular end point, e.g., the delay to a particular buffer.

As such, the system may determine a context for each of buffers 420-432. Further, the system may determine the buffer delay and the node delay for each of buffers 420-432. The system assigns buffers 420-432 to one or more groups based upon matching contexts. Within each group, the system may determine one or more sub-groups. The system may determine the sub-groups based upon the delay(s), e.g., the buffer delay and/or the node delay, for each of buffers 420-432.

Figure 5:
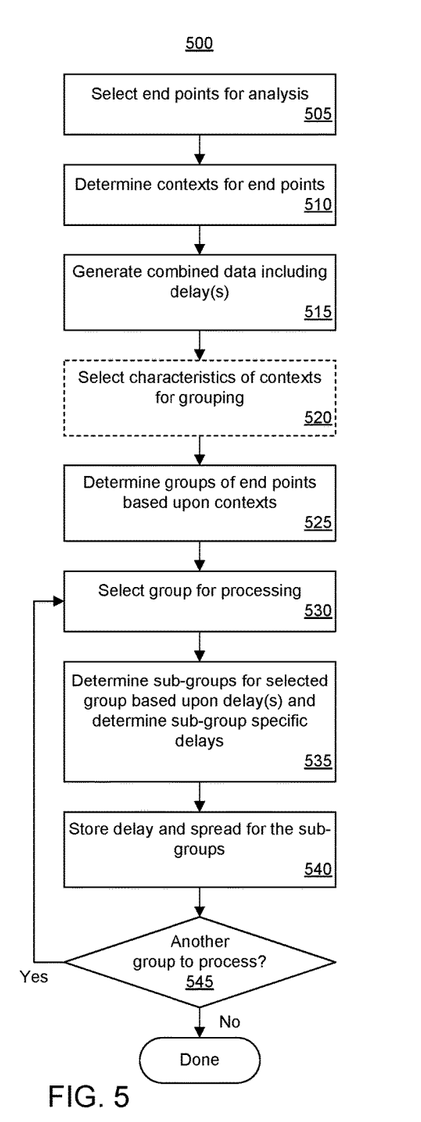
FIG. 5 is a flow chart illustrating an example of a method of generating delays of exit points for a clock circuit.

FIG. 5 is a flow chart illustrating an example of a method 500 of generating delays of exit points for a clock circuit. Method 500 may be performed by a system such as system 100 of FIG. 1.

In block 505, the system selects end points for analysis. In one aspect, the system selects end points of a clock circuit from within a programmatic description of a circuit design. In another aspect, the system selects end points of a clock circuit of an IC. The IC may be a programmable IC. It should be appreciated that the techniques described within this disclosure for delay generation may be performed or applied to any of a variety of circuits that may be modeled or represented using the circuit structure described with reference to FIG. 2.

In block 510, the system determines contexts for the end points. As discussed, each context for an end point includes a type of a buffer, a type of a buffer node, a type of a pre-buffer, and a type of a pre-buffer node. In another arrangement, each context may also include a tile crossing for the pre-buffer node and/or a tile crossing for the buffer node.

In block 515, the system generates combined data including delay(s). The system, having generated contexts for the end points, may store the end points in association with their respective contexts within a data structure within a computer readable storage medium. In addition, the system may associate one or more delays with each end point. The delay(s) may be stored within the data structure within the computer readable storage medium. For example, for each end point, the system may store the buffer delay (buffer delay 225) in association with the end point and the context of the end point. For each end point, the system may store the node delay (node delay 230) in association with the end point and the context of the end point.

In block 520, the system may select the characteristics of the contexts to be used for purposes of grouping the end points. Block 520 may be optional. In illustration, a user may specify which characteristics are to be used for purposes of grouping. In one example, the particular characteristics used for grouping may be received by the system as user inputs. In another example, the particular characteristics used for grouping may be read by the system from a configuration file that may be edited. In this regard, the characteristics used for grouping may be any combination or sub-combination of a type of a buffer, a type of a buffer node, a type of a pre-buffer, a type of a pre-buffer node, a tile crossing for the pre-buffer node, and/or a tile crossing for the buffer node. In the event that block 520 is omitted, the system may group the end points based upon each of the characteristics of the contexts.

In block 525, the system determines groups of end points based upon the contexts. The system, for example, assigns end points to groups based upon matching types of the characteristics of the contexts. In the event that particular characteristics of the contexts are selected in block 520 for purposes of grouping, the system may use only those selected characteristics of the contexts for grouping.

Having formed groups in block 525, each group includes exit points having same characteristics and same types for the characteristics. The combination of types of the (selected) characteristics in each context in a group is equal to the combination of types of the (selected) characteristics of each other context in the group. In other words, the characteristics of each context in a group have the same types as the types of the characteristics of each other context in the group. After block 525, the end points are organized into one or more groups.

In block 530, the system selects a group for processing. In block 535, the system determines sub-groups for the selected group. Further, the system determines sub-group specific delays. The system determines the sub-groups based upon one or more of the delays. In one arrangement, the system determines sub-groups using a clustering technique.

An example of sub-group formation is described in greater detail with reference to FIGS. 6 and 9 of this disclosure.

In block 540, the system stores sub-group specific delays and the spreads for the sub-groups. In one example, the sub-group specific delay is a mean delay of the exit points of the sub-group. For example, the system stores the sub-group specific delay and the spread for each of the sub-groups determined in block 535 within a data structure within memory. The sub-group specific delay for each sub-group may later be used for purposes of circuit design, analysis, and/or simulation. In illustration, rather than using the end point specific delays for each of the end points, the system, or another system performing a circuit design and/or simulation operation, uses the sub-group specific delay of the sub-group to which an end point belongs for each end point thereby processing fewer delays. By using fewer delays, e.g., using sub-group specific delays for the end points, the system improves runtime of the circuit design and/or simulation operations. Further, the system may perform circuit design and/or simulation for larger circuit designs that would otherwise be the case.

In block 545, the system determines whether there is another group to be processed. If so, method 500 may loop back to block 530 to continue processing. If not, method 500 may end.

Figure 6:
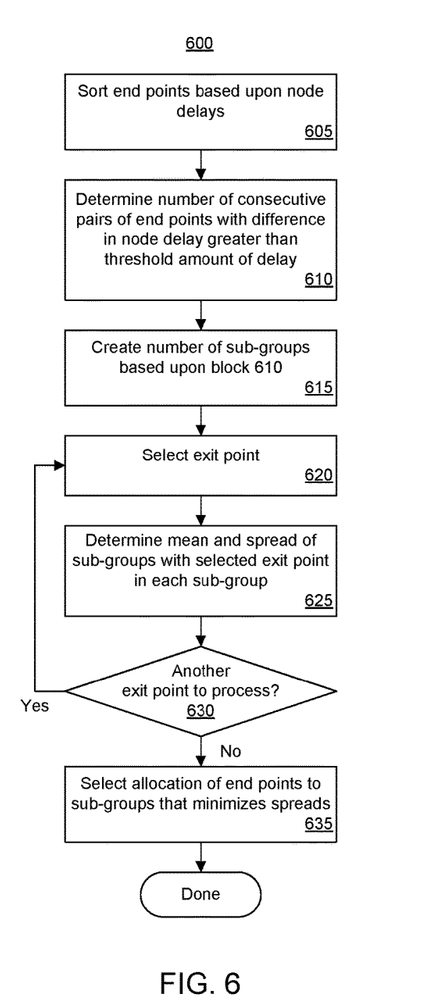
FIG. 6 is a flow chart illustrating an example method of sub-group formation for end points.

FIG. 6 is a flow chart illustrating an example method 600 of sub-group formation for end points. Method 600 is an example of a clustering technique that may be used to form sub-groups. In one arrangement, method 600 may be used to implement block 535 of FIG. 5. It should be appreciated that other clustering techniques may be used and that FIG. 6 is provided as one example of a clustering technique.

In block 605, the system sorts the end points based upon node delays. For example, the system sorts the end points based upon node delay in increasing or in decreasing order. In block 610, the system determines the number of consecutive pairs of end points where the difference in the node delay of the end points of the pair exceeds a threshold amount of delay. In block 615, the system creates a number of sub-groups equal to the number determined in block 610. In one aspect, the locations where the delays between end points exceed the threshold amount of delay may be used as breakpoints defining the sub-groups of end points, at least initially. For example, end points located between breakpoints are included in a same sub-group.

In block 620, the system selects an end point for processing. In block 625, the system determines a sub-group specific node delay and a spread for the node delays for the sub-groups with the selected exit point being allocated, or assigned, to each sub-group. As noted, mean node delay may be used as the sub-group specific node delay. The spread of the node delays may be determined as the minimum node delay of a sub-group subtracted from the maximum node delay of the sub-group.

For example, the system may assign the selected end point to the first sub-group. With the selected end point assigned to the first sub-group, the system may determine the mean node delay and the spread of the node delays of the first sub-group. The initial set of exit points that are members of the sub-groups may include any exit points located between the breakpoints determined in block 610. The system may then remove the selected end point from the first sub-group and assign the selected end point to the second sub-group. With the selected end point assigned to the second sub-group, the system may determine the mean node delay and the spread of the node delays of the second sub-group. The system may continue for each of the sub-groups first assigning the selected end point to the sub-group and then determining the mean node delay and the spread of the node delays with the selected end point as a member of that sub-group.

In block 630, the system determines whether another end point remains to be processed. If so, method 600 may loop back to block 620 to continue processing. If not, method 600 may proceed to block 635.

In block 635, the system selects an allocation of end points to sub-groups that minimizes the spreads of the node delays of the sub-groups. The system, for example, may use any of a variety of different measures for determining minimization of spreads such as the average or mean spread, ensuring that no individual spread exceeds a maximum value, and so forth. The particular measure used, however, is not intended as a limitation of the inventive arrangements described herein.

Example 1 includes pseudocode illustrating a clustering technique for formation of sub-groups that may be used to implement block 535 of FIG. 5. Within Example 1, the term "cluster" is used interchangeably with "sub-group."

Example 1

```
Sort the end points based on node delays
for (i= 1; i <= number of exit points; i++) {
   Create a new cluster if (node_delay (i+1) –
      node_delay(i))>pre_determined_threshold;
   number_of_clusters++;
   mean = average of node delays in cluster;
   spread = max delay – min delay; }
for (i= 1; i <= number of exit points; i++) {
   for (j = 1; j <= number_of_clusters; j++) {
      determine mean and spread of all clusters by moving $i^{th}$ delay to $j^{th}$
         cluster;}}
Choose allocation that gives minimum spread for each cluster
```

FIG. 7 is a table 700 illustrating an example of combined data. Table 700 illustrates an example of a data structure that may be generated and stored in a computer readable storage medium of system 100 as described with reference to block 515 of FIG. 5. The data structure includes end points, with each end point being associated with a context, a buffer delay, and a node delay. As noted, a context for an end point includes types for each of the characteristics of buffer, buffer node, pre-buffer, and pre-buffer node. A context may include types for the characteristics of buffer tile crossing and/or pre-buffer tile crossing.

End points may be assigned to groups based upon the context of each end point. As discussed, the particular characteristics of the contexts used to assign end points to groups may be selected. For example, while the contexts may include the aforementioned characteristics, all of the characteristics or a subset of the characteristics may be used to form groups of end points.

FIG. 8 is a table 800 illustrating an example of group formation. Table 800 illustrates an example of a data structure that may be generated and stored in a computer readable storage medium of system 100 after performing block 525 of FIG. 5. In one aspect, the system may modify table 700 to generate table 800.

In the example of FIG. 8, the system has assigned end points to groups according to matching types for the buffer, buffer node, pre-buffer, and pre-buffer node characteristics. As pictured, end points 1, 2, and 10 are assigned to group 1. Each of end points 1, 2, and 10 has a same type for the buffer, buffer node, pre-buffer, and pre-buffer node characteristics.

End points 3 and 6 are assigned to group 2. Each of end points 3 and 6 has same types for the buffer, buffer node, pre-buffer, and pre-buffer node characteristics. End point 4 is assigned to group 3. End point 5 is assigned to group 4. End points 7, 8, and 9 are assigned to group 5. Each of end points 7, 8, and 9 have same types for the buffer, buffer node, pre-buffer, and pre-buffer node characteristics. Appreciably, at least one type for the buffer, buffer node, pre-buffer, and/or pre-buffer node characteristics differ from one group to another.

Figure 9:
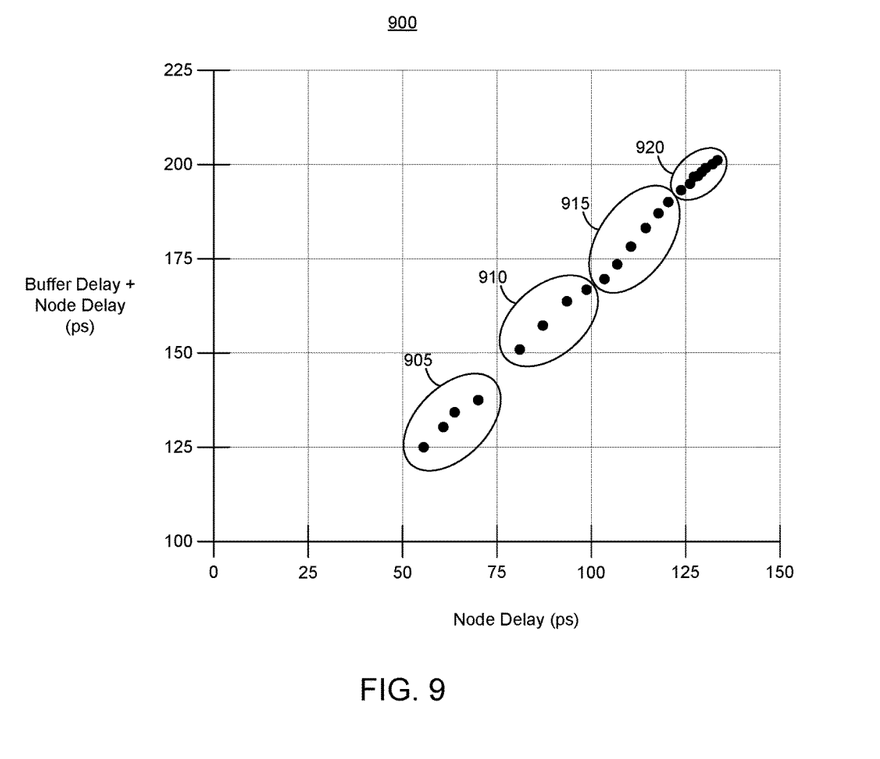
FIG. 9 is a graph illustrating sub-group formation.

FIG. 9 is a graph 900 illustrating sub-group formation. FIG. 9 visually illustrates example operations that may be performed by the system in implementing the clustering technique described with reference to FIG. 6. In the example of FIG. 6, end points of a group are plotted and shown on a graph of (Buffer Delay+Node Delay) vs. (Node Delay) with each axis denoted in picoseconds (ps). FIG. 9 illustrates that the system has formed four different sub-groups shown as sub-groups 905, 910, 915, and 920.

In other words, once the groups are determined, based on the exit point clustering information, sub-grouping is performed. For example, FIG. 9 may illustrate a plot of node delays from point 442 to each of the exit points 420-432 vs. the sum of buffer delay and node delays from point 442 to each of the exit points 420-432. Exit point clustering is determined by clustering nearby points on the plot of node+buffer delay as a function of node delay as pictured in FIG. 9. Exit point clustering may be performed to minimize spread of different points around the mean value of the sub-groups.

Considering the example of FIG. 9 where 4 sub-groups are formed, each of sub-groups 905-920 has means and spreads of (Mean_905, Spread_905), (Mean_910, Spread_910), (Mean_915, Spread_915), and (Mean_920, Spread_920). If allocating a given exit point to a sub-group reduces the spread of any sub-group, that option may be chosen. Conversely, if allocating a given exit point to a sub-group reduces the spread of two or more sub-groups, that option may be rejected. As noted, the final sub-grouping is the allocation of end points to sub-groups that achieves an acceptable, e.g., an improved or a best possible, combination of spreads for all clusters.

Figure 10:
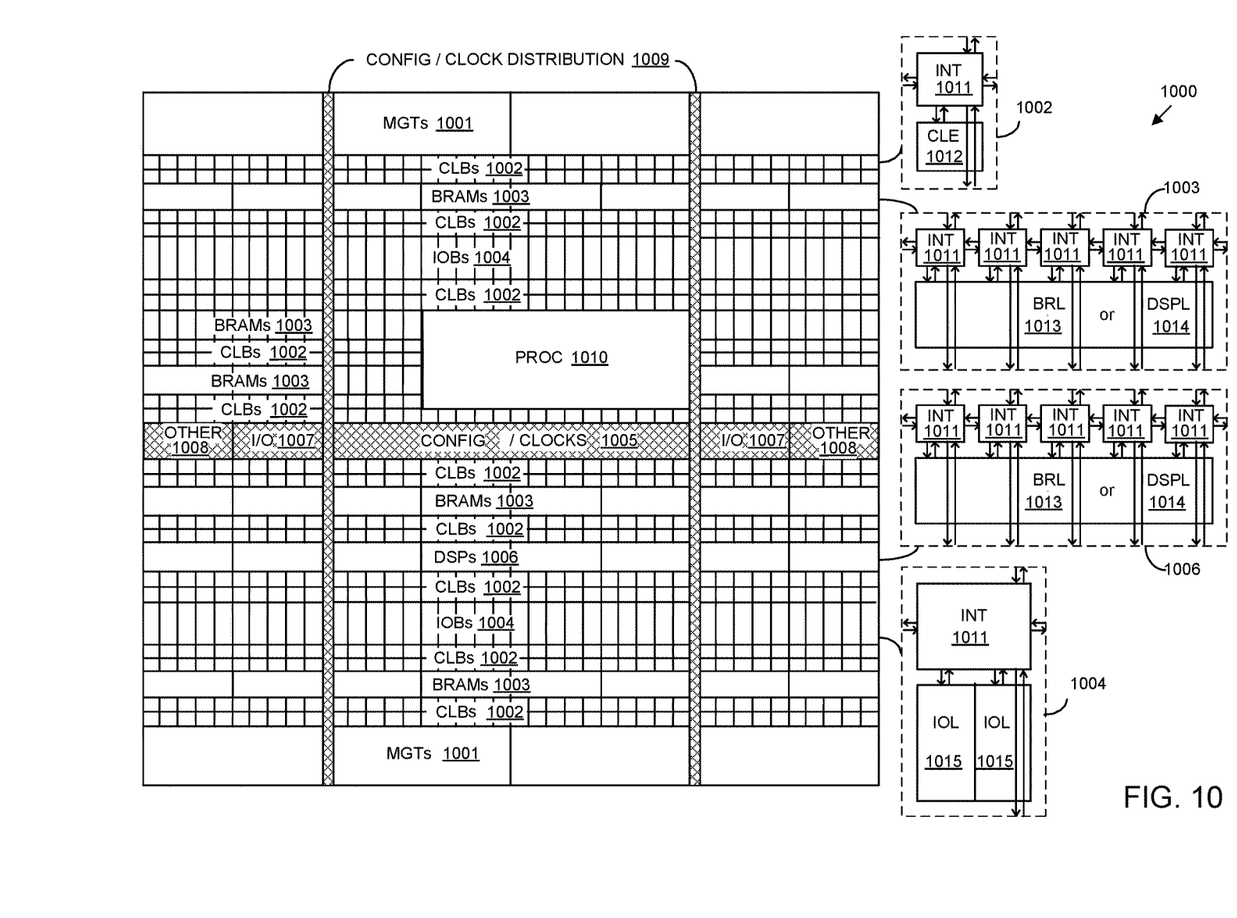
FIG. 10 is a block diagram illustrating an exemplary architecture for an integrated circuit.

FIG. 10 is a block diagram illustrating an exemplary architecture 1000 for an IC. Architecture 1000 may be implemented within a programmable IC. For example, architecture 1000 may be used to implement a field programmable gate array (FPGA). Architecture 1000 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

Architecture 1000 is provided as an example of an IC and circuitry to which the examples described herein may be applied in performing circuit analysis and/or simulation operations. As noted, any circuit with a structure as described with reference to FIG. 2 may be analyzed using the grouping and sub-grouping procedures described herein.

As shown, architecture 1000 includes several different types of programmable circuit, e.g., logic, blocks. For example, architecture 1000 may include a large number of different programmable tiles including multi-gigabit transceivers (MGTs) 1001, configurable logic blocks (CLBs) 1002, random access memory blocks (BRAMs) 1003, input/output blocks (IOBs) 1004, configuration and clocking logic (CONFIG/CLOCKS) 1005, digital signal processing blocks (DSPs) 1006, specialized I/O blocks 1007 (e.g., configuration ports and clock ports), and other programmable logic 1008 such as digital clock managers, analog-to-digital converters, system monitoring logic, and so forth.

In some ICs, each programmable tile includes a programmable interconnect element (INT) 1011 having standardized connections to and from a corresponding INT 1011 in each adjacent tile. Therefore, INTs 1011, taken together, implement the programmable interconnect structure for the illustrated IC. Each INT 1011 also includes the connections to and from the programmable logic element within the same tile, as shown by the examples included at the top of FIG. 10.

For example, a CLB 1002 may include a configurable logic element (CLE) 1012 that may be programmed to implement user logic plus a single INT 1011. A BRAM 1003 may include a BRAM logic element (BRL) 1013 in addition to one or more INTs 1011. Typically, the number of INTs 1011 included in a tile depends on the height of the tile. As pictured, a BRAM tile has the same height as five CLBs, but other numbers (e.g., four) also may be used. A DSP tile 1006 may include a DSP logic element (DSPL) 1014 in addition to an appropriate number of INTs 1011. An IOB 1004 may include, for example, two instances of an I/O logic element (IOL) 1015 in addition to one instance of an INT 1011. The actual I/O pads connected to IOL 1015 may not be confined to the area of IOL 1015.

In the example pictured in FIG. 10, a columnar area near the center of the die, e.g., formed of regions 1005, 1007, and 1008, may be used for configuration, clock, and other control logic. Horizontal areas 1009 extending from this column may be used to distribute the clocks and configuration signals across the breadth of the programmable IC. Thus, in one aspect, the operations described herein may be used to analyze the clock circuitry included within regions 1005, 1007, 1008, and/or 1009. It should be appreciated, however, that in other IC architectures, clock circuitry may be interspersed among other circuitry and/or tiles and not included in specific or specialized regions as illustrated in FIG. 10.

Some ICs utilizing the architecture illustrated in FIG. 10 include additional logic blocks that disrupt the regular columnar structure making up a large part of the IC. The additional logic blocks may be programmable blocks and/or dedicated circuitry. For example, a processor block depicted as PROC 1010 spans several columns of CLBs and BRAMs.

In one aspect, PROC 1010 may be implemented as dedicated circuitry, e.g., as a hardwired processor, that is fabricated as part of the die that implements the programmable circuitry of the IC. PROC 1010 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1010 may be omitted from architecture 1000 and replaced with one or more of the other varieties of the programmable blocks described. Further, such blocks may be utilized to form a "soft processor" in that the various blocks of programmable circuitry may be used to form a processor that can execute program code as is the case with PROC 1010.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 10 that are external to PROC 1010 such as CLBs 1002 and BRAMs 1003 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1010.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 1010 or a soft processor. In some cases, architecture 1000 includes a dedicated configuration processor that loads the configuration bitstream to the appropriate configuration memory and/or processor memory. The dedicated configuration processor does not execute user-specified program code. In other cases, architecture 1000 may utilize PROC 1010 to receive the configuration bitstream, load the configuration bitstream into appropriate configuration memory, and/or extract program code for execution.

FIG. 10 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 10 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1010 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process. As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of generating delays for a clock circuit can include determining, using a processor, groups of contexts for exit points of the clock circuit based upon a plurality of characteristics and a type selected from a plurality of different types for each characteristic, forming, using the processor, sub-groups of the exit points based upon delay values for the exit points, and determining, using the processor, a delay value for each sub-group.

The forming of the sub-groups can include, for each group, clustering the exit points of the group into the sub-groups. The clustering can include sorting the exit points based upon node delay and creating a sub-group for each difference in node delay between consecutive exit points that exceeds a threshold amount of delay. The clustering can also include selectively assigning exit points to different ones of the sub-groups based upon reduction in spread of the sub-groups.

In one aspect, each group can include a different combination of types for the plurality of characteristics.

In another aspect, the characteristics can include a buffer, a buffer node, a pre-buffer, and a pre-buffer node. The types of the buffer and the pre-buffer can include different types of buffers. The types of the buffer node and the pre-buffer node can include different wire types.

In yet another aspect, the characteristics can include tile crossings of the buffer node and tile crossings of the pre-buffer node. The types of tile crossings of the buffer node can indicate a type of a tile of a programmable integrated circuit that the buffer node crosses. The types of the tile crossings of the buffer node can indicate the type of the tile of the programmable integrated circuit that the pre-buffer node crosses.

A system can include a processor configured to initiate executable operations for generating delays for a clock circuit. The executable operations can include determining groups of contexts for exit points of the clock circuit based upon a plurality of characteristics and a type selected from a plurality of different types for each characteristic, forming sub-groups of the exit points based upon delay values for the exit points, and determining a delay value for each sub-group.

The forming of the sub-groups can include, for each group, clustering the exit points of the group into the sub-groups. The clustering can include sorting the exit points based upon node delay and creating a sub-group for each difference in node delay between consecutive exit points that exceeds a cluster threshold. The clustering can also include selectively assigning exit points to different ones of the sub-groups based upon reduction in spread of the sub-groups.

In one aspect, each group can include a different combination of types for the plurality of characteristics.

In another aspect, the characteristics can include a buffer, a buffer node, a pre-buffer, and a pre-buffer node. The types of the buffer and the pre-buffer can include different types of buffers. The types of the buffer node and the pre-buffer node can include different wire types.

In yet another aspect, the characteristics can include tile crossings of the buffer node and tile crossings of the pre-buffer node. The types of tile crossings of the buffer node can indicate a type of a tile of a programmable integrated circuit that the buffer node crosses. The types of the tile crossings of the buffer node can indicate the type of the tile of the programmable integrated circuit that the pre-buffer node crosses.

A computer program product includes a computer readable storage medium having program code stored thereon for generating delays for a clock circuit. The program code is executable by a processor to perform operations. The operations include determining groups of contexts for exit points of the clock circuit based upon a plurality of characteristics and a type selected from a plurality of different types for each characteristic, forming sub-groups of the exit points based upon delay values for the exit points, and determining a delay value for each sub-group.

The forming of the sub-groups can include, for each group, clustering the exit points of the group into the sub-groups. The clustering can include sorting the exit points based upon node delay and creating a sub-group for each difference in node delay between consecutive exit points that exceeds a cluster threshold. The clustering can also include selectively assigning exit points to different ones of the sub-groups based upon reduction in spread of the sub-groups.

In one aspect, each group can include a different combination of types for the plurality of characteristics.

In another aspect, the characteristics can include a buffer, a buffer node, a pre-buffer, and a pre-buffer node. The types of the buffer and the pre-buffer can include different types of buffers. The types of the buffer node and the pre-buffer node include different wire types.

In yet another aspect, the characteristics can include tile crossings of the buffer node and tile crossings of the pre-buffer node. The types of tile crossings of the buffer node can indicate a type of a tile of a programmable integrated circuit that the buffer node crosses. The types of the tile crossings of the buffer node can indicate the type of the tile of the programmable integrated circuit that the pre-buffer node crosses.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of generating delays for a clock circuit, comprising:

determining, using a processor, groups of contexts for exit points of the clock circuit based upon a plurality of characteristics and a type selected from a plurality of different types for each characteristic;

forming, using the processor, sub-groups of the exit points based upon delay values for the exit points, wherein the forming the sub-groups includes sorting the exit points based upon node delay and creating the sub-groups based upon differences in node delay between consecutive exit points exceeding a threshold amount of delay;

determining, using the processor, a delay value for each sub-group based upon the delay values for the exits points in each respective sub-group; and simulating a circuit design using the delay values of the sub-groups;
wherein the plurality of characteristics include wire type and the plurality of different types for each characteristic include wire orientation and indicate whether the wire type is for a lower level of a tree structure implementation of the clock circuit.

2. The method of claim 1, wherein the forming the sub-groups comprises:
selectively assigning exit points to different ones of the sub-groups based upon reduction in spread of the sub-groups.

3. The method of claim 1, wherein each group includes a different combination of types for the plurality of characteristics.

4. The method of claim 1, wherein:
the characteristics include a buffer, a buffer node, a pre-buffer, and a pre-buffer node;
types of the buffer and the pre-buffer include different types of buffers; and
types of the buffer node and the pre-buffer node include different wire types.

5. The method of claim 1, wherein:
the characteristics include tile crossings of the buffer node and tile crossings of the pre-buffer node;
types of tile crossings of the buffer node indicate a type of a tile of a programmable integrated circuit that the buffer node crosses; and
types of the tile crossings of the buffer node indicate the type of the tile of the programmable integrated circuit that the pre-buffer node crosses.

6. A system, comprising:
a processor configured to initiate executable operations for generating delays for a clock circuit including:
determining groups of contexts for exit points of the clock circuit based upon a plurality of characteristics and a type selected from a plurality of different types for each characteristic;
forming sub-groups of the exit points based upon delay values for the exit points, wherein the forming the sub-groups includes sorting the exit points based upon node delay and creating the sub-groups based upon differences in node delay between consecutive exit points exceeding a threshold amount of delay;
determining a delay value for each sub-group based upon the delay values for the exit points in each respective sub-group; and
simulating a circuit design using the delay values of the sub-groups;
wherein the plurality of characteristics include wire type and the plurality of different types for each characteristic include wire orientation and indicate whether the wire type is for a lower level of a tree structure implementation of the clock circuit.

7. The system of claim 6, wherein the forming the sub-groups comprises:
selectively assigning exit points to different ones of the sub-groups based upon reduction in spread of the sub-groups.

8. The system of claim 6, wherein each group includes a different combination of types for the plurality of characteristics.

9. The system of claim 6, wherein:
the characteristics include a buffer, a buffer node, a pre-buffer, and a pre-buffer node;
types of the buffer and the pre-buffer include different types of buffers; and
types of the buffer node and the pre-buffer node include different wire types.

10. The system of claim 6, wherein:
the characteristics include tile crossings of the buffer node and tile crossings of the pre-buffer node;
types of tile crossings of the buffer node indicate a type of a tile of a programmable integrated circuit that the buffer node crosses; and
types of the tile crossings of the buffer node indicate the type of the tile of the programmable integrated circuit that the pre-buffer node crosses.

11. A computer program product comprising a computer readable storage medium having program code stored thereon for generating delays for a clock circuit, the program code executable by a processor to perform operations comprising:
determining groups of contexts for exit points of the clock circuit based upon a plurality of characteristics and a type selected from a plurality of different types for each characteristic;
forming sub-groups of the exit points based upon delay values for the exit points, wherein the forming the sub-groups includes sorting the exit points based upon node delay and creating the sub-groups based upon differences in node delay between consecutive exit points exceeding a threshold amount of delay;
determining a delay value for each sub-group based upon the delay values for the exits points in each respective sub-group; and
simulating a circuit design using the delay values of the sub-groups;
wherein the plurality of characteristics include wire type and the plurality of different types for each characteristic include wire orientation and indicate whether the wire type is for a lower level of a tree structure implementation of the clock circuit.

12. The computer program product of claim 11, wherein the forming the sub-groups comprises:
selectively assigning exit points to different ones of the sub-groups based upon reduction in spread of the sub-groups.

13. The computer program product of claim 11, wherein each group includes a different combination of types for the plurality of characteristics.

14. The computer program product of claim 11, wherein:
the characteristics include a buffer, a buffer node, a pre-buffer, and a pre-buffer node;
types of the buffer and the pre-buffer include different types of buffers; and
types of the buffer node and the pre-buffer node include different wire types.

* * * * *